(12) United States Patent
Liu

(10) Patent No.: US 6,663,272 B1
(45) Date of Patent: Dec. 16, 2003

(54) ILLUMINANT TURBULENT FLOW PLATE

(76) Inventor: Yao-Huang Liu, 58, Ma Yuan West St., Taichung (TW)

( * ) Notice: Subject to any disclaimer, the term of this patent is extended or adjusted under 35 U.S.C. 154(b) by 0 days.

(21) Appl. No.: 10/223,902

(22) Filed: Aug. 16, 2002

(51) Int. Cl.[7] .................................................. B60Q 1/26
(52) U.S. Cl. ........................ 362/541; 362/496; 362/545
(58) Field of Search ................................ 362/493, 495, 362/496, 541, 540, 542, 543, 544, 545; 340/464, 468, 479

(56) References Cited

U.S. PATENT DOCUMENTS

| | | | | |
|---|---|---|---|---|
| 5,016,996 A | * | 5/1991 | Ueno | 359/838 |
| D373,432 S | * | 9/1996 | Wu | D26/28 |
| 6,027,235 A | * | 2/2000 | Chen | 362/497 |
| 6,241,373 B1 | * | 6/2001 | Kelley et al. | 362/545 |
| 6,326,888 B1 | * | 12/2001 | Wang | 340/463 |
| 6,533,445 B1 | * | 3/2003 | Rogers | 362/540 |

* cited by examiner

Primary Examiner—Alan Cariaso
Assistant Examiner—Ali Alavi

(57) ABSTRACT

An illuminant turbulent flow plate has a main panel, a pair of waterproof washers, a pair of periphery flanges disposed on two sides of the main panel, a pair of electric circuit boards, and a pair of side covers. A plurality of light emitting diodes are disposed on a periphery of each electric circuit board. Each periphery flange defines a recess to receive the corresponding electric circuit board. Two through holes are formed on two sides is of the main panel. Each waterproof washer encloses the corresponding periphery flange. Each side cover has a threaded hole and a periphery groove to receive the corresponding periphery flange. Each periphery flange has a threaded aperture. Each side cover engages with the corresponding periphery flange.

1 Claim, 3 Drawing Sheets

ILLUMINANT TURBULENT FLOW PLATE

BACKGROUND OF THE INVENTION

The present invention relates to an illuminant turbulent flow plate. More particularly, the present invention relates to an illuminant turbulent flow plate which illuminates while a brake light is operated.

A conventional illuminant is often disposed on a middle portion of a turbulent flow plate. However, the conventional illuminant cannot be disposed on different portions of the turbulent flow plate.

SUMMARY OF THE INVENTION

An object of the present invention is to provide an illuminant turbulent flow plate which has a plurality of light emitting diodes to illuminate on two sides of the illuminant turbulent flow plate while a brake light is operated.

Accordingly, an illuminant turbulent flow plate comprises a main panel, a pair of waterproof washers, a pair of periphery flanges disposed on two sides of the main panel, a pair of electric circuit boards, and a pair of side covers. A plurality of light emitting diodes are disposed on a periphery of each of the electric circuit boards. Each of the periphery flanges defines a recess to receive the corresponding electric circuit board. Two through holes are formed on two sides of the main panel. A wire is connected to the corresponding electric circuit board. The wire passes through one of the through holes of the main panel. Each of the waterproof washers encloses the corresponding periphery flange. Each of the side covers has a threaded hole and a periphery groove to receive the corresponding periphery flange. Each of the periphery flanges has a threaded aperture to match the corresponding threaded hole. Each of the side covers engages with the corresponding periphery flange. A bolt passes through the threaded hole and the threaded aperture to fasten the corresponding side cover and the corresponding periphery flange together.

DETAILED DESCRIPTION OF THE INVENTION

Figure 1:
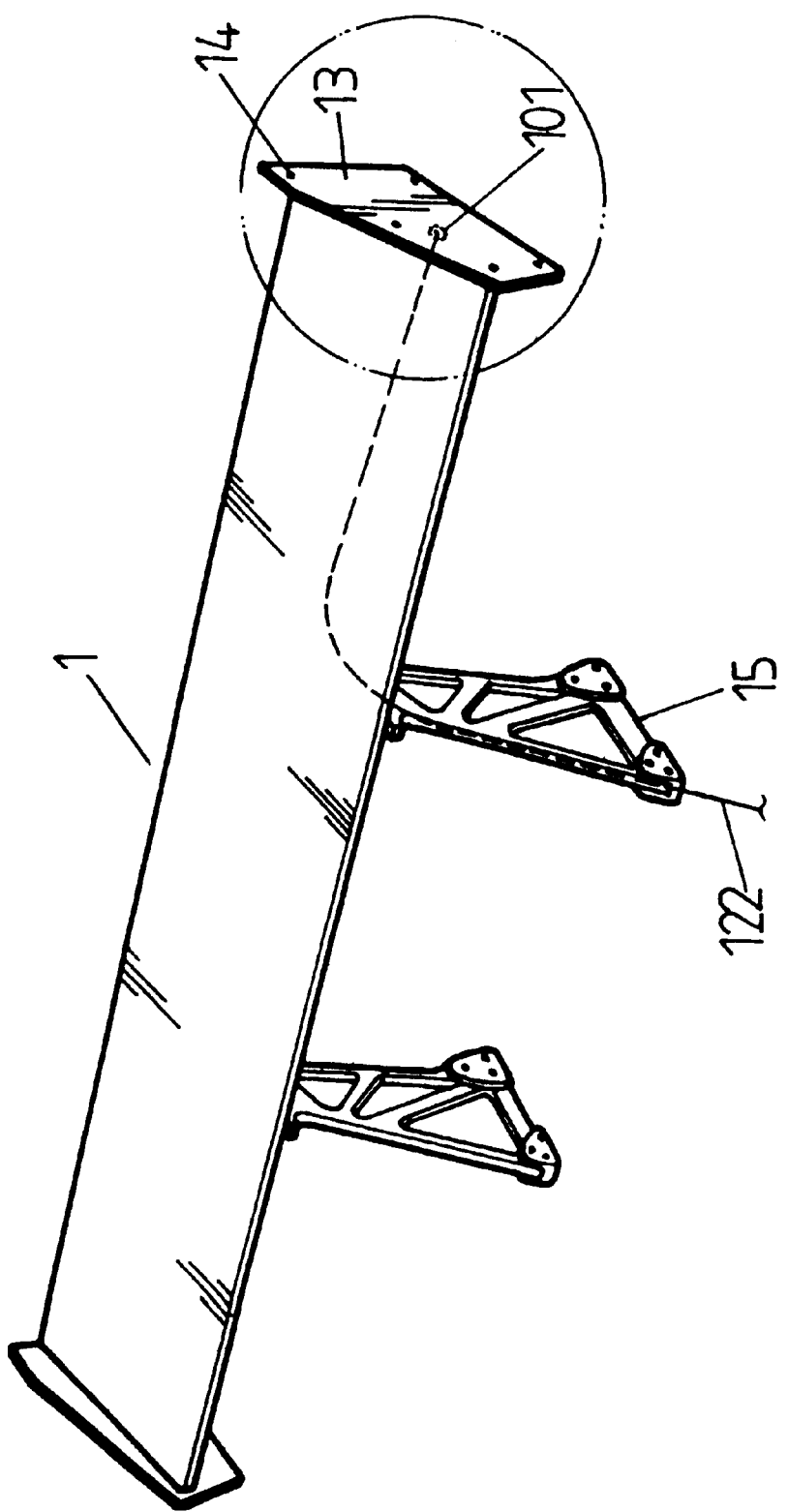
FIG. 1 is a perspective assembly view of an illuminant turbulent flow plate of a preferred embodiment in accordance with the present invention.
Figure 2:
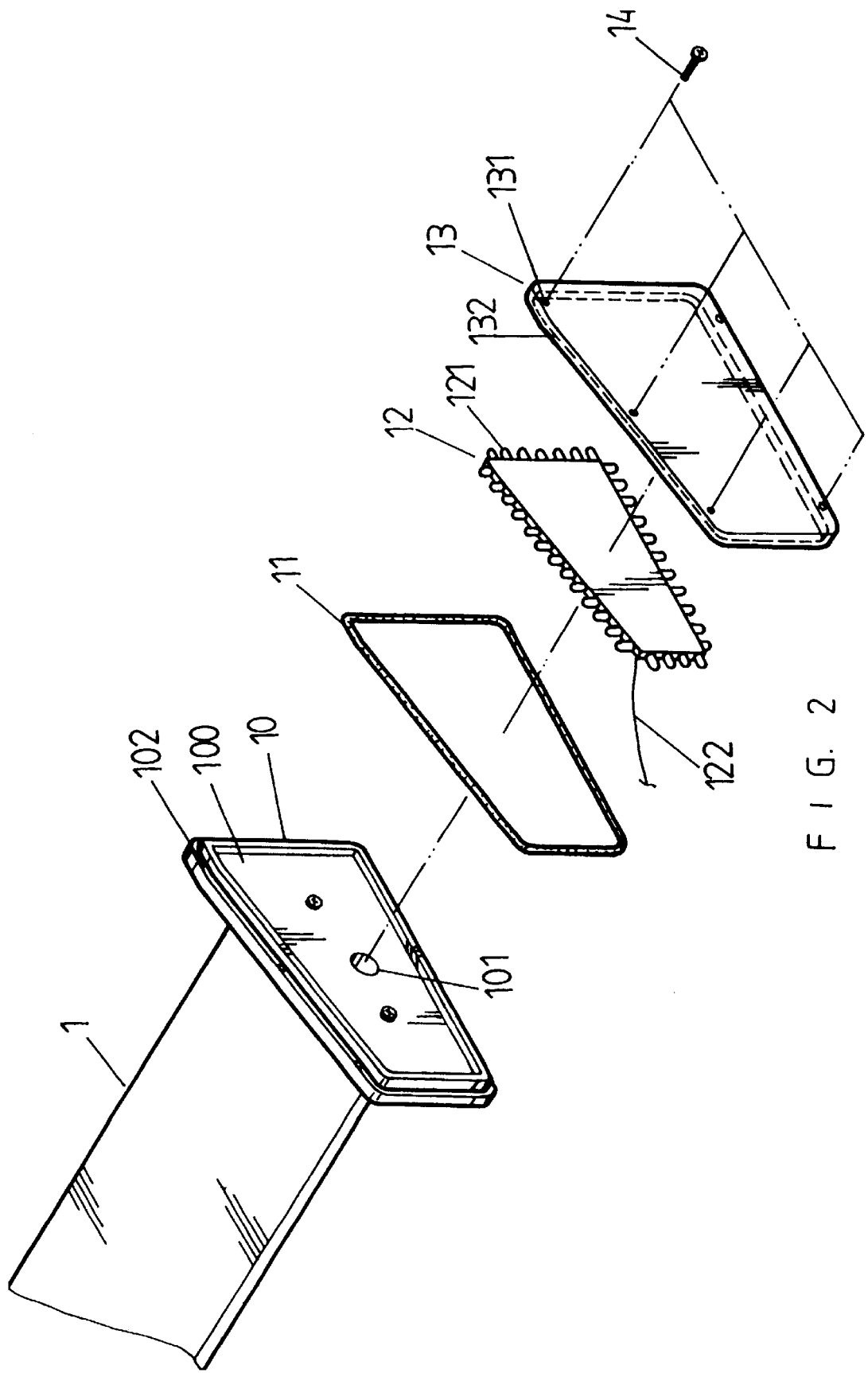
FIG. 2 is a partially perspective exploded view of an illuminant turbulent flow plate of a preferred embodiment in accordance with the present invention.
Figure 3:
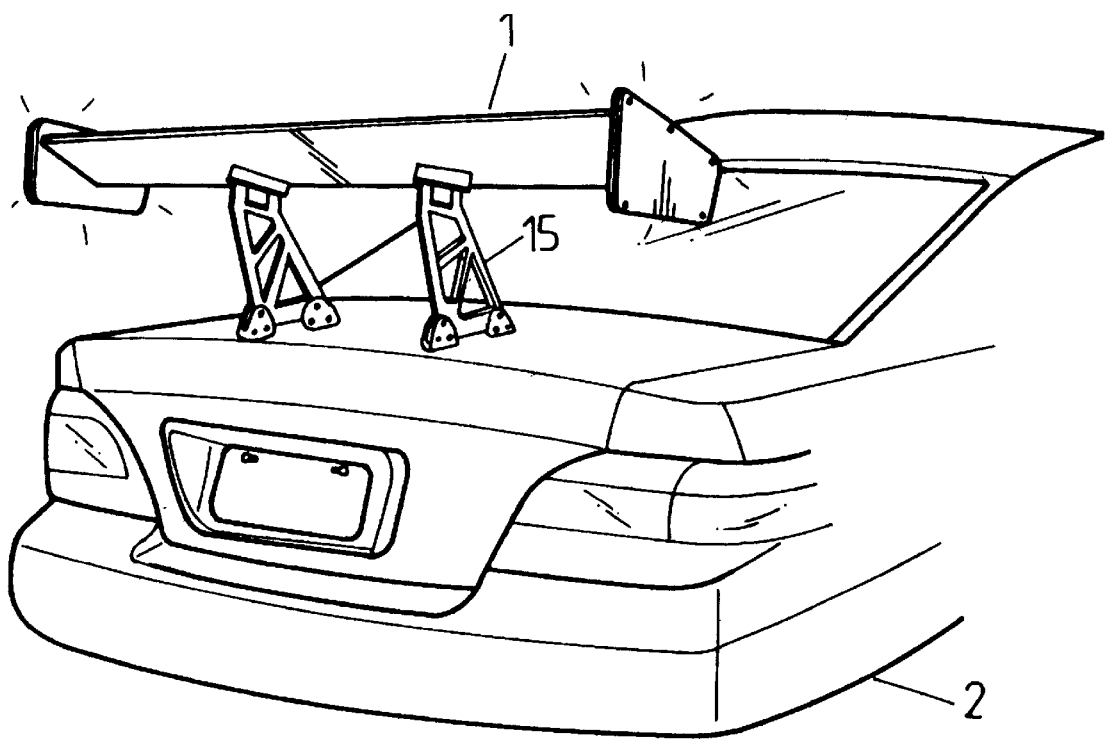
FIG. 3 is a schematic view illustrating an application of an illuminant turbulent flow plate of a preferred embodiment in accordance with the present invention.

Referring to FIGS. 1 to 3, an illuminant turbulent flow plate comprises a main panel 1, a pair of waterproof washers 11, a pair of periphery flanges 10 disposed on two sides of the main panel 1, a pair of electric circuit boards 12, and a pair of side covers 13.

A plurality of light emitting diodes 121 are disposed on a periphery of each of the electric circuit boards 12.

Each of the periphery flanges 10 defines a recess 100 to receive the corresponding electric circuit board 12.

Two through holes 101 are formed on two sides of the main panel 1.

A wire 122 is connected to the corresponding electric circuit board 12.

The wire 122 passes through one of the through holes 101 of the main panel 1.

Each of the waterproof washers 11 encloses the corresponding periphery flange 10.

Each of the side covers 13 has a threaded hole 131 and a periphery groove 132 to receive the corresponding periphery flange 10.

Each of the periphery flanges 10 has a threaded aperture 102 to match the corresponding threaded hole 131.

Each of the side covers 13 engages with the corresponding periphery flange 10.

A bolt 14 passes through the threaded hole 131 and the threaded aperture 102 to fasten the corresponding side cover 13 and the corresponding periphery flange 10 together.

Two racks 155 are disposed on a vehicle 2.

The main panel 1 is disposed on the racks 155.

The invention is not limited to the above embodiment but various modification thereof may be made. Further, various changes in form and detail may be made without departing from the scope of the invention.

I claim:

1. An illuminant turbulent flow plate comprises:

a main panel, a pair of waterproof washers, a pair of periphery flanges disposed on two sides of the main panel, a pair of electric circuit boards, and a pair of side covers, a plurality of light emitting diodes disposed on a periphery of each of the electric circuit boards, each of the periphery flanges defining a recess to receive the corresponding electric circuit board, two through holes formed on two sides of the main panel, a wire connected to the corresponding electric circuit board, the wire passing through one of the through holes of the main panel, each of the waterproof washers enclosing the corresponding periphery flange, each of the side covers having a threaded hole and a periphery groove to receive the corresponding periphery flange, each of the periphery flanges having a threaded aperture to match the corresponding threaded hole, each of the side covers engaging with the corresponding periphery flange, and a bolt passing through the threaded hole and the threaded aperture to fasten the corresponding side cover and the corresponding periphery flange together.

* * * * *